(12) United States Patent
Stolle

(10) Patent No.: US 6,828,893 B2
(45) Date of Patent: Dec. 7, 2004

(54) TRANSFORMER CIRCUIT ARRANGEMENT

(75) Inventor: Reinhard Stolle, Neufahm (DE)

(73) Assignee: Infineon Technologies, AG, Munich (DE)

( * ) Notice: Subject to any disclaimer, the term of this patent is extended or adjusted under 35 U.S.C. 154(b) by 0 days.

(21) Appl. No.: 10/688,804

(22) Filed: Oct. 15, 2003

(65) Prior Publication Data

US 2004/0124959 A1 Jul. 1, 2004

(30) Foreign Application Priority Data

Oct. 17, 2002 (DE) .......................... 102 48 471

(51) Int. Cl.[7] .............................................. H01F 27/28
(52) U.S. Cl. ...................... 336/182; 336/180; 336/192; 379/349
(58) Field of Search ................................. 336/182, 180, 336/192, 200, 222; 379/349, 387.01, 399.01, 93.05

(56) References Cited

U.S. PATENT DOCUMENTS

| 2,337,965 A | 12/1943 | Bode |
| 2001/0021249 A1 | 9/2001 | Aschrafi |

Primary Examiner—Lincoln Donovan
Assistant Examiner—Jennifer A. Poker
(74) Attorney, Agent, or Firm—Peter F. Corless; Steven M. Jensen; Edwards & Angell, LLP

(57) ABSTRACT

A transformer circuit arrangement has a first transformer (201) with a first lower limit frequency (fu1) and a first upper limit frequency (fo1), and a second transformer (202) with a second lower limit frequency (fu2) and a second upper limit frequency (fo2), whereby the first lower limit frequency (fu1) is smaller than the second upper limit frequency (fu2), and the second upper limit frequency (fo2) is greater than the first upper limit frequency (fo1), the second lower limit frequency (fu2) is preferably not greater or smaller than the first upper limit frequency (fo1) by a factor of 10, at least one input (103, 104) of the first transformer is electrically connected to an input (209, 210) of the second transformer, and at least one output (205, 206) of the first transformer is connected to an output (107, 108) of the second transformer, and the transformer circuit arrangement has a band pass behaviour with a lower overall limit frequency (fuges) and an upper overall limit frequency (foges), whereby the lower overall limit frequency (fuges) is smaller than the first upper limit frequency (fo1) and the second lower limit frequency (fu2), and whereby the upper overall limit frequency (foges) is greater than the first upper limit frequency (fo1) and the second upper limit frequency (fo2).

16 Claims, 6 Drawing Sheets

Figure 3A:
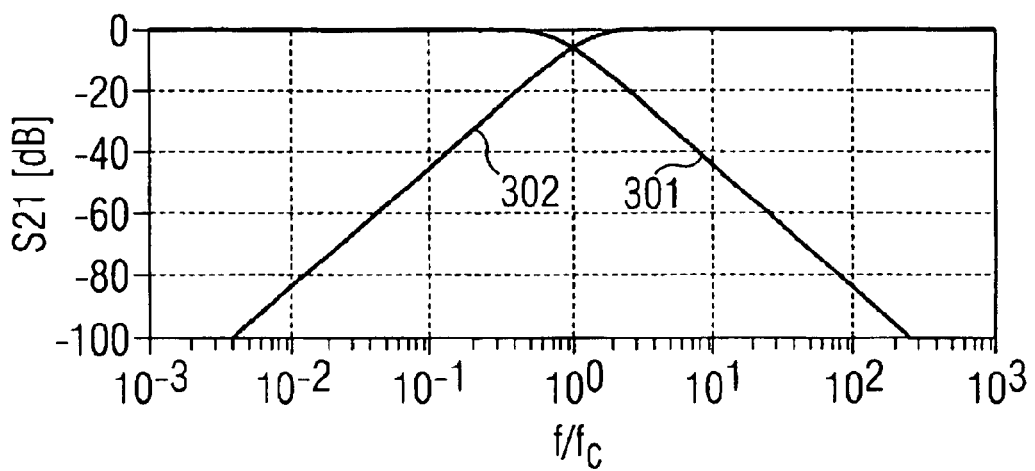

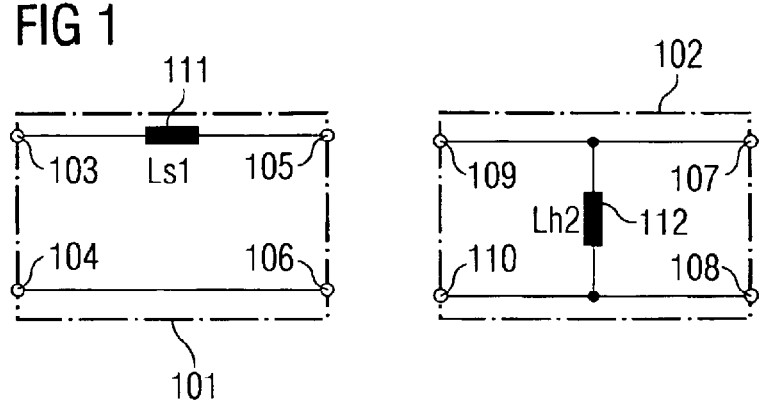
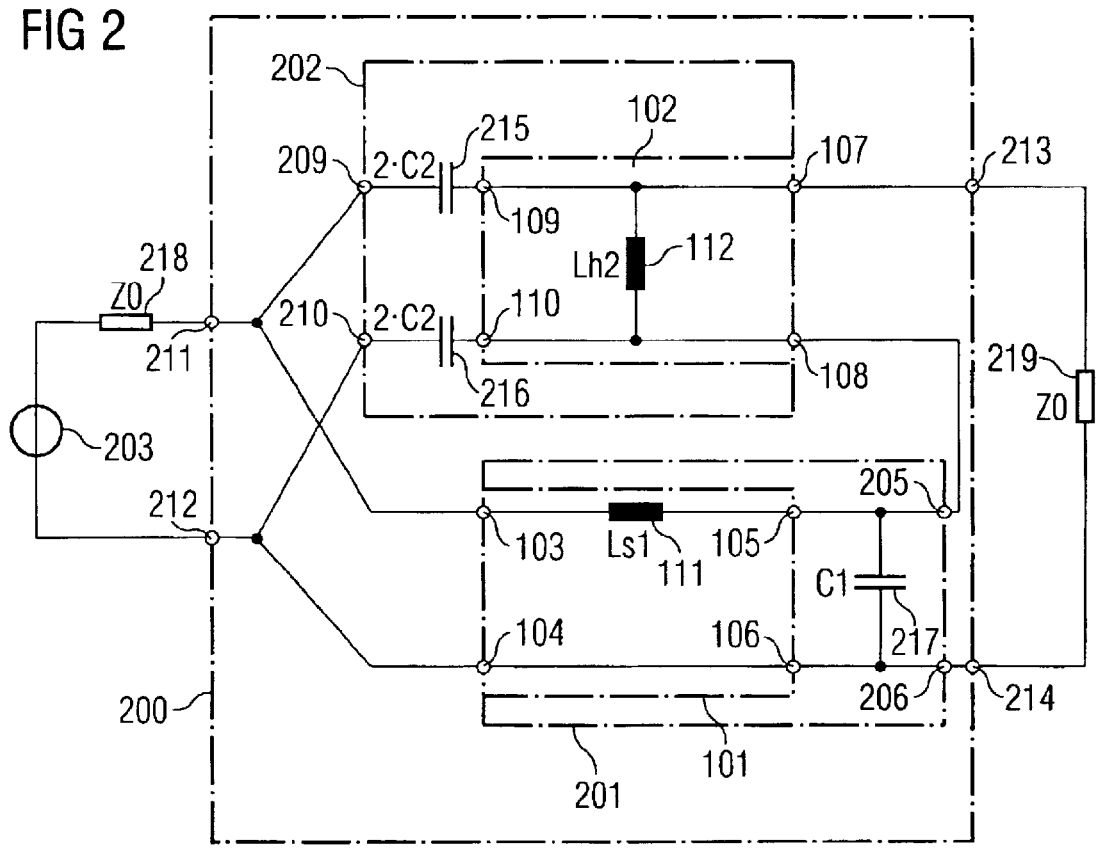

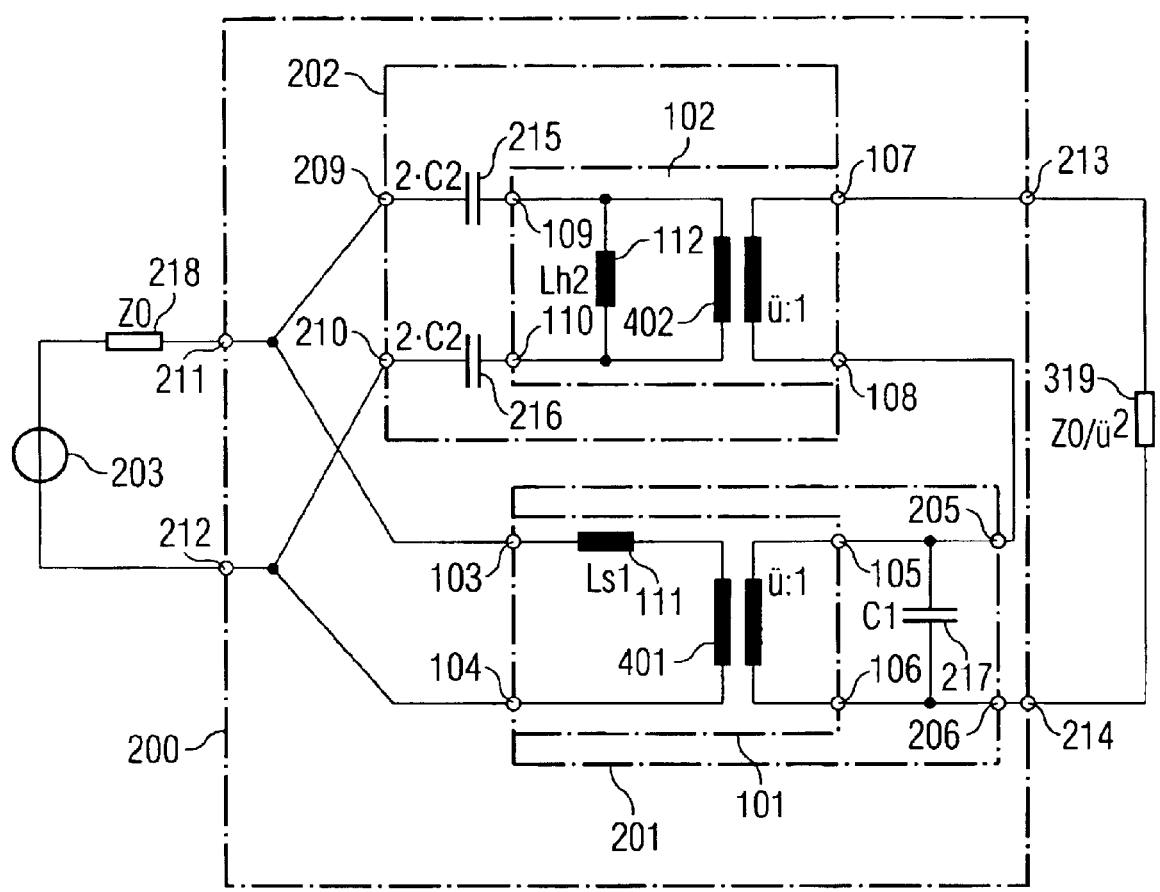

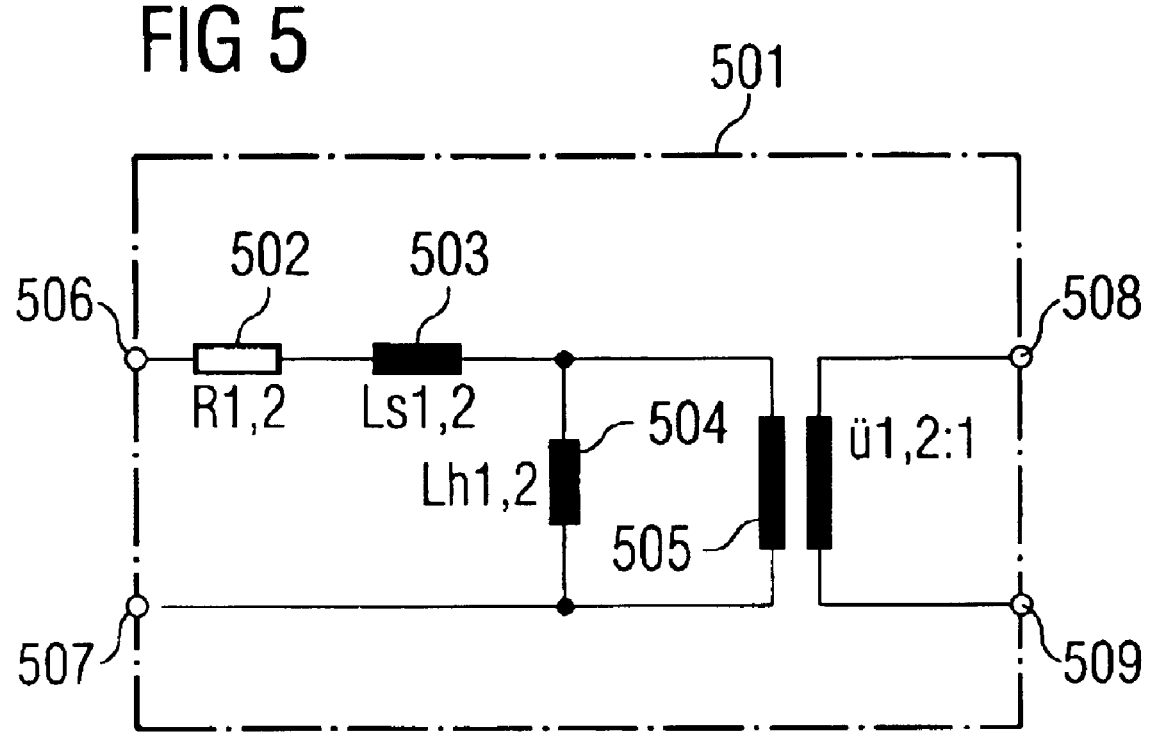

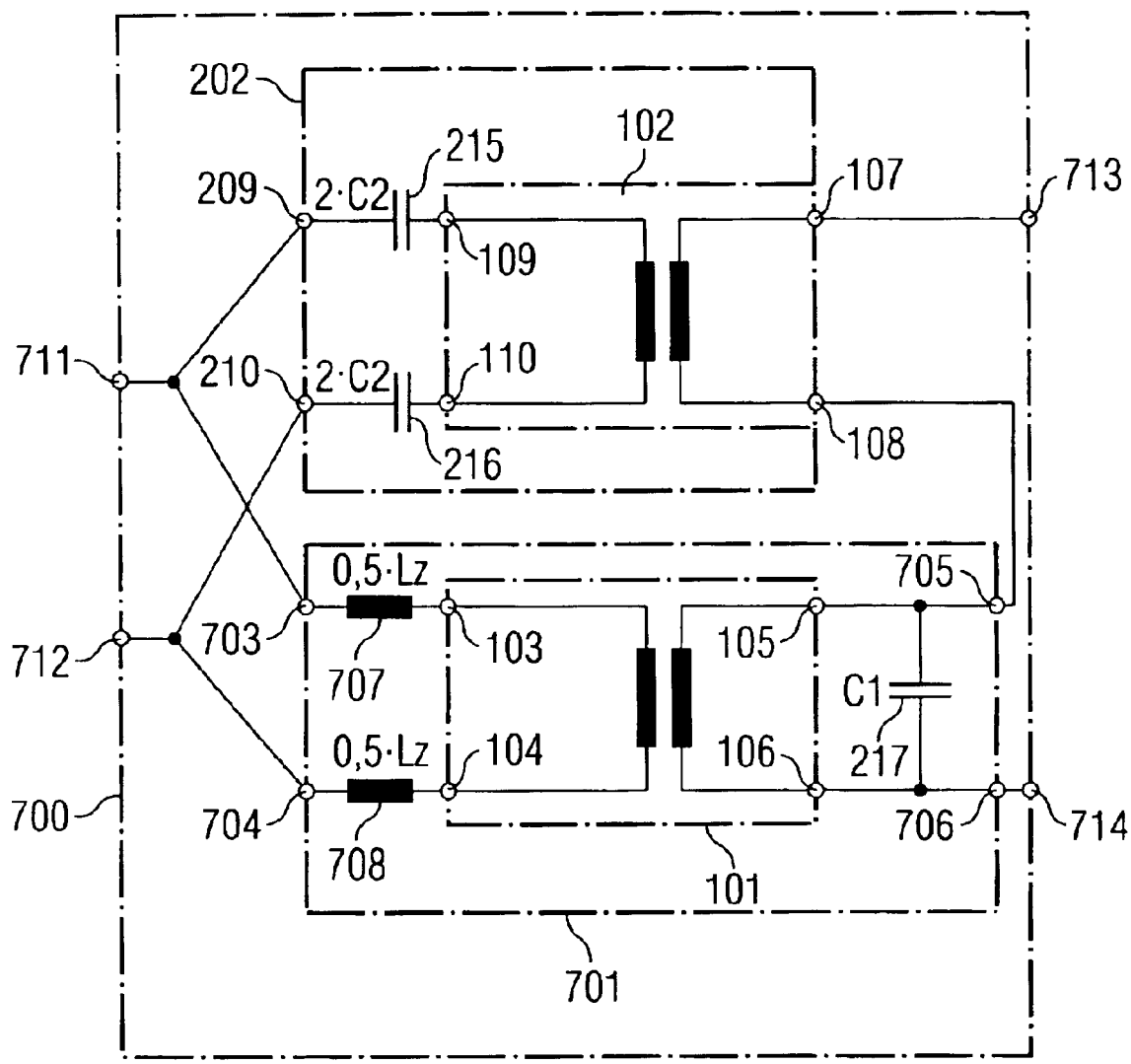

TRANSFORMER CIRCUIT ARRANGEMENT

The invention relates to a transformer circuit arrangement which is designed, in particular, for the transmission of signals in message transmission systems or communication systems, such as, for example, xDSL systems.

The devices referred to as transformers in message transmission systems are essential passive electrical components which fulfil a wide variety of tasks such as, for example, electrical decoupling, the transforming of voltages/currents, or the changing of impedance values. Due to their large spatial requirements, their high price in comparison with other passive components, their non-linear behaviour, their losses, and the absence of integration capability, the use of such transformers is, however, to be avoided as far as possible. In many cases, it has not hitherto been possible for the transformer to be replaced by a device of equal value, with the result that it cannot be done away with.

In xDSL systems ("Digital Subscriber Line"), for example, the transformer determines the performance capacity of these systems. What is required is a high degree of linearity of the transformer over the entire transmission range, with, at the same time, minimum manufacturing costs. These two requirements are, however, difficult to fulfil simultaneously. In practice, the actual properties of a transformer therefore derive from a compromise, which is to be decided on according to the particular application situation.

An additional problem is incurred by the bandwidth of the transformer. In many applications, a large bandwidth is required. In conjunction with high linearity, however, this is associated with higher costs. Accordingly, with the use of a transformer, the problem arises of optimisation of the parameters of bandwidth, linearity, and manufacturing costs. Inasmuch as no compromises are possible with the bandwidth or the linearity, the comparatively high costs for the transformer, incurred in particular due to its core material as well as by its mechanical layout, were hitherto unavoidable.

Reductions are possible with regard to the bandwidth, but these are not optimum. With SHDSL systems ("Single-Pair-High-Bit-Rate Digital Subscriber Line"), the required bandwidth of the transformer is, for example, proportional to the variable signal bandwidth of the system or the transceiver. The optimum lower limit frequency of the transformer for a maximum data rate or range width of the system is approximately proportional to the bandwidth of the system. While too low a lower limit frequency of the system can be adjusted by means of a digital highpass filter in increments to the signal bandwidth of the system, i.e. can be increased, a lower limit frequency which is too high cannot be compensated for subsequently. Efforts must therefore be made to arrange the lower limit frequency of the transformer to suit the smallest bandwidth of the system which is to be used, and the upper limit frequency of the transformer to correspond to the greatest bandwidth which is to be used. If this is not possible, a compromise which frequently satisfies is to lay out the transformer only for the largest bandwidth to be used, whereby reductions in the performance at the smallest bandwidths to be used are taken into account.

With xDSL systems, in general a substantial linearity of the transformer for a maximum data rate or range is in most cases only required on such channels as have only low crosstalk, or none at all. The use of xDSL systems is in many cases subject to strictly formulated rules (known as "Deployment Rules"), which are intended to ensure functional performance even with the greatest fault incidence to be assumed ("worst case"). Accordingly, if a system is only designed for the greatest fault incidence to be assumed, such as, for example, the presence of severe cross-talk interference, the requirements for linearity are reduced, because the interference caused by the non-linearity in the presence of interference caused by cross-talk noise does not occur. A transformer designed in this way is in this case not well-suited for transmission on channels with low cross-talk.

A further possibility consists of offering different equipment fitting variants on a line card, for example, with in each case a transformer for specific applications. A disadvantage of this procedure is, inter alia, the additional re-equipping with components required in addition to the transformer, since the dimensions of the circuit as a whole is frequently dependent on the properties of the transformer used in each individual case. In addition to this, extensive test series are in most cases required for such systems, which are incurred anew for each circuit variant.

The re-equipping of components referred to, however, excludes a desirable switchover in terms of software between different operational frequency ranges or transformers, with the result that only one electronic or electromechanical switchover comes into consideration. The use of electronic switches is problematic, however, since highly linear electronic switches are necessary because of the high demands for linearity, which are associated with high costs. In addition, switchover by means of relays is also possible. This, however, represents an additional component to be accommodated on a line card per channel, so that less space remains for the equipping of as many channels as possible.

The object of the invention is to provide an economical transformer circuit arrangement with which signals can be transmitted with a large frequency bandwidth and with high linearity.

This object is achieved by a transformer circuit arrangement according to claim 1. Subclaims refer to preferred embodiments.

The transformer circuit arrangement according to the invention has a first transformer with at least two inputs or input connections respectively, and two outputs or output connections respectively, and a first frequency response with a first lower limit frequency and a first upper limit frequency, as well as a second transformer with at least two inputs or input connections respectively, and two outputs or output connections respectively, and a second frequency response with a second lower limit frequency and a second upper limit frequency. The first lower limit frequency is smaller than the second lower limit frequency, and the second upper limit frequency is greater than the first upper limit frequency. In addition, the second lower limit frequency is preferably not greater or smaller by a factor of 10 than the first upper limit frequency. The transformer circuit arrangement according to the invention has a frequency behaviour with bandpass character with a lower overall limit frequency and an upper overall limit frequency. In this situation, the lower overall limit frequency is smaller than the first upper limit frequency of the first transformer and the second lower limit frequency of the second transformer, and the upper overall limit frequency is greater than the second lower limit frequency of the second transformer and the first upper limit frequency of the first transformer.

The first and/or the second transformer can have an individual transformation ratio in each case, an individual main inductance, and an individual scatter inductance. Advantageously, the transformation ratio of the first transformer is equal to the transformation ratio of the second transformer. As a result, the transformers can be arranged symmetrically to one another in respect of their frequency response.

The first and second transformers can be designed as quadripole units with in each case two inputs and two outputs. The inputs of the transformers can be connected together in parallel or series. Likewise, the outputs of the transformers can be connected in parallel or series. According to one advantageous embodiment, either the inputs are connected in parallel and the outputs as series, or the inputs as series and the outputs in parallel. As a result of this, an addition of the frequency responses of the individual transformers can be achieved, to form one overall total frequency response of the transformer circuit arrangement according to the invention, so that, in an advantageous embodiment, a bandwidth can be derived which consists of the total of the bandwidths of the first and second transformers.

Preferably, the first transformer has a first capacitor which is connected in parallel upstream or downstream. Likewise, the second transformer can have a second capacitor, which is connected in series upstream or downstream, so that, for example, the individual transformers cannot be short-circuited in their connection for their individual transformer frequency ranges.

According to an advantageous embodiment, one or more transformers have a frequency response with Butterworth behaviour, such as Butterworth behaviour of the second degree. Accordingly, a maximum flat path of the frequency response is derived over the entire bandwidth, so that the maximum flat path can be obtained over the entire bandwidth of the transformer circuit arrangement according to the invention. In addition, the Butterworth frequency response has, advantageously, a low flank slope, as a result of which an increased sensitivity in the overall frequency response of the transformer circuit arrangement according to the invention can be avoided, in relation, for example, to component tolerances and additional phase distortions.

One or more limit frequencies can be selected in such a way that the frequency response of the individual insertion loss (value of the transformation function) at this frequency or frequencies respectively has an attenuation of 6 dB. Advantageously, the first upper limit frequency of the first transformer is equal to the second lower limit frequency of the second transformer. The lower overall limit frequency can be equal to the first lower limit frequency of the first transformer and/or the upper overall limit frequency can be equal to the second upper limit frequency of the second transformer.

According to a further embodiment, the first transformer can have an additional inductance, which is connected in series upstream or downstream to it or to its scatter inductance. This is particularly advantageous if a desired scatter inductance for the transformer cannot be achieved with sufficient precision during manufacture. In this case, for example, a small scatter inductance can be manufactured which can be disregarded in relation to the additional inductance which is to be connected, so that close to the desired overall scatter inductance of the transformer is derived. The scatter inductance of the transformer and the additional inductance pertaining to it can, however, be dimensioned in such a way that in total they produce the desired overall scatter inductance.

The transformer circuit arrangement according to the invention is designed in particular for the transmission of signals in message transmission systems, such as, for example, xDSL systems. With this, one large signal bandwidth or several smaller different bandwidths can be transmitted, in multiplex format, in an economical manner. Thanks to the use of two economically priced transformers of small bandwidth, an even more economical and space-saving device or circuit arrangement can be created for the transmission of signals with, simultaneously, large bandwidth and high linearity, which in overall terms behaves like one individual transformer, as a result of which a switchover in terms of software between different signal frequency ranges is possible. An electronic or electromechanical switchover, and the use of component fitting variants, are not necessary.

With the transformer circuit arrangement according to the invention, it is therefore possible for systems to be created with a large bandwidth dynamic. It is conceivable, for example, for an xDSL Multistandard line card to be created, with which SHDSL signals can be transmitted in the frequency range from, for example, 5 kHz to 500 kHz, and VDSL signals ("Very High Speed Digital Subscriber Line") in the frequency range from 500 kHz to 10 MHz in frequency multiplex. In this situation, the first upper 6 dB limit frequency of the first transformer and the second lower 6 dB limit frequency of the second transformer can lie at 500 kHz. There are, however, also applications conceivable in systems with a single large signal bandwidth in the order of, for example, 5 kHz to 10 MHz.

Figure 3B:
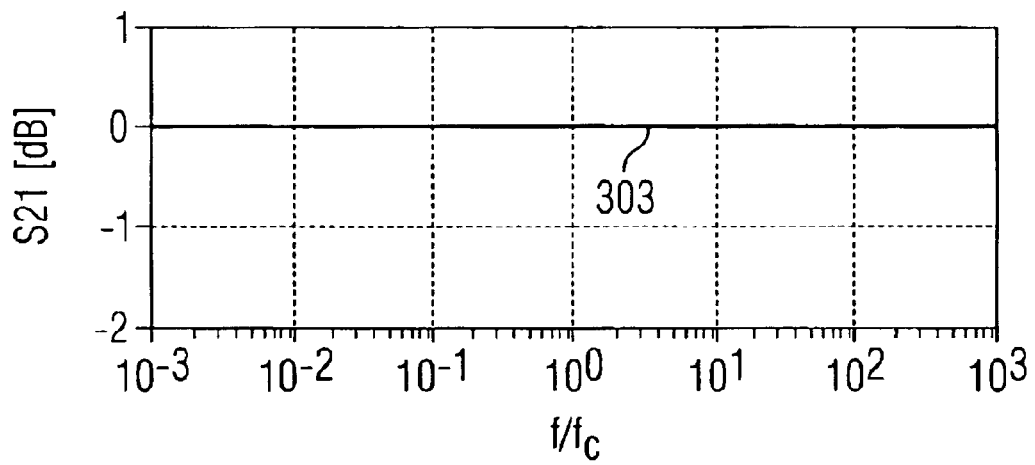
Figure 3C:
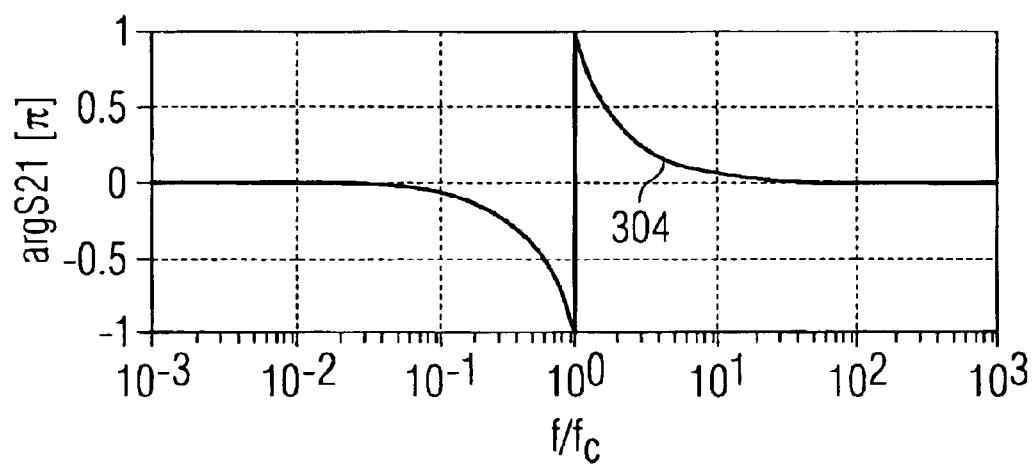
Figure 6A:
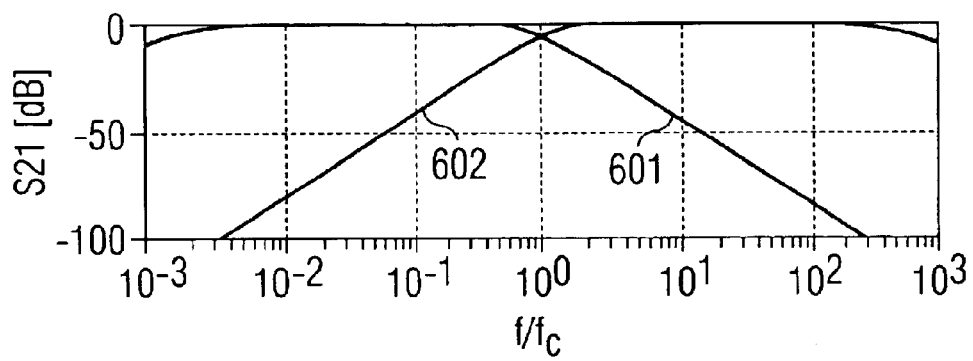
Figure 6B:
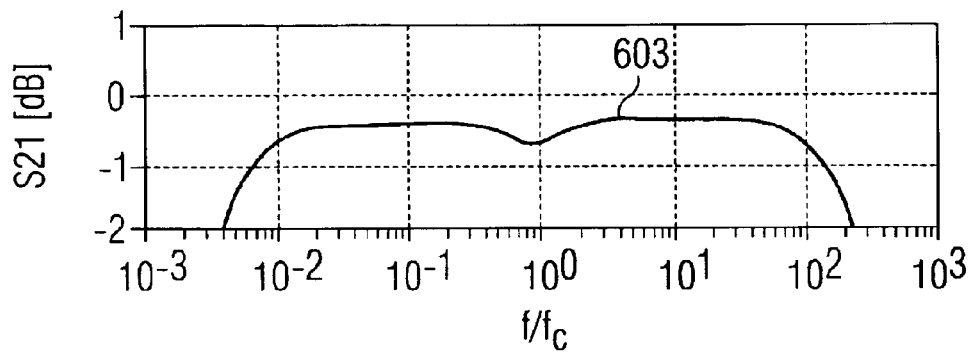

Advantageous embodiments of the invention are explained in greater detail hereinafter on the basis of the drawings. These show:

FIG. 1A first equivalent circuit diagram of a first transformer (left) and a first equivalent circuit diagram of a second transformer (right), FIG. 2 An equivalent circuit diagram of a transformer circuit arrangement according to a first embodiment according to the invention, FIG. 3 The individual insertion loss of the first transformer and of the second transformer of FIG. 2 as a function of the signal frequency (FIG. 3a), the insertion loss of the transformer circuit arrangement according to the invention represented in FIG. 2, as a function of the signal frequency (FIG. 3b) and of the corresponding phase response corresponding to FIG. 3b (FIG. 3c), FIG. 4 An equivalent circuit diagram of a transformer circuit arrangement according to a second embodiment according to the invention, FIG. 5 A detailed equivalent circuit diagram of the first or second transformer, FIG. 6 The individual insertion loss of the first transformer and of the second transformer as a function of the signal frequency (FIG. 6a), the insertion loss of the connection of the two transformers as a function of the signal frequency (FIG. 6b), the phase response corresponding to FIG. 6b (FIG. 6c), and the corresponding active return loss as a function of the signal frequency (FIG. 6d) according to the equivalent circuit diagram from FIG. 5, and FIG. 7 A schematic circuit diagram of a third embodiment according to the invention of a transformer circuit arrangement.

FIG. 1 shows simple linear equivalent circuit diagrams of a first transformer 101 (left) and a second transformer 102 (right). The first transformer 101 has a series inductance 111, Ls1 (scatter inductance) as well as, in each case, two inputs or input connections respectively 103 and 104, and two outputs or output connections 105 and 106 respectively. The second transformer 102 has a parallel inductance 112, Lh2 (main inductance) as well as, in each case, two inputs or input connections respectively 109 and 110, and two outputs or output connections 107 and 108 respectively. Both transformers 101, 102 are therefore designed as quadripole.

Let the operational frequency range or frequency response of the first transformer 101 be indicated by:

fu1≦f≦fo1, with the signal frequency f, the first lower limit frequency fu1, and the first upper limit frequency fo1.

Let the operational frequency range or frequency response of the second transformer 102 be indicated by:

fu2≦f≦fo2, with the second lower limit frequency fu2, and the second upper limit frequency fo2.

It further applies in this example that fu1<fo1=fu2<fo2, so that the transfer frequency ranges of the two transformers 101, 102 merge seamlessly into one another. Also conceivable, however, is an intersection of the operational frequency ranges of the transformers or even a frequency spacing of the ranges, lying, for example, in the range of an order of magnitude (such as a factor of 10) or less. Preferably, the general formulation applies:

fu1<fo1≦fu2<fo2.

It may be mentioned at this juncture that the term "limit frequency" is defined herein in each case as a 6 dB limit frequency.

In accordance with the equivalent circuit diagrams represented in FIG. 1, the first transformer 101 has the transmission behaviour of a lowpass, whereby the first lower limit frequency fu1 in the ideal case equals zero. The second transformer 102 correspondingly has the transmission behaviour of a highpass, whereby the second upper limit frequency fo2 in the ideal case goes towards infinity.

FIG. 2 shows an equivalent circuit diagram of an embodiment of a transformer circuit arrangement, in which the two transformers 101, 102 from FIG. 1 are connected together. In this situation, the first transformer 201 is additionally provided with a parallel capacitance connected downstream from this, or first capacitance 217, C1, as a result of which what is referred to as a chain lowpass is formed. The first transformer 201, extended by the first capacitance 217, C1, has the two inputs 103 and 104, as well as the two outputs 205 and 206.

The second transformer 202 additionally contains series capacitances connected upstream, or second part capacitances 215 and 216, which in this case each have a size of 2C2, with the result that in total they form a series capacitance or second capacitance of C2. Another distribution or allocation of the capacitance values is also possible. For example, it is also possible for only one of the two series capacitances 215, 216 to be provided for, which then have a size of C2. The second transformer 102, together with the series capacitances 215 and 216, forms what is referred to as a chain highpass. The second transformer 202, extended by the series capacitances 215, 216, has the two inputs 209 and 210 as well as the two outputs 107 and 108.

The capacitances C1, C2 can, as shown in FIG. 2, be realised in each case as capacitors.

The transformer circuit arrangement according to the invention, in the example represented here, consists of the interconnection of the first and second transformers 201 and 202 to form one overall transformer, which in turn has two inputs 211 and 212, as well as two outputs 213 and 214. The circuit shown in FIG. 2 is completed by a power source or current source 203 and an input resistor 218, Z0, which are connected upstream of the overall transformer 200, as well as a terminating resistor 219, Z0, which is connected downstream of the overall transformer 200. To adjust the power, the output resistor 219 has the same size Z0 as the input resistor 218. The resistors can, however, if required, also have different sizes and values.

In the example from FIG. 2, in each case an input 103, 104 of the first transformer 201, with an input 209, 210 of the second transformer 201, is connected to a corresponding input 211, 212 of the overall transformer 200, so that a parallel circuit of the inputs of the first and second transformers 201, 202 is derived. In addition to this, an output 205 of the first transformer 201 is connected to an output 108 of the second transformer 202, while by contrast the other output 206, 213 in each case of the transformers 201, 202 forms an output of the overall transformer, such that a series circuit of the outputs of the first and second transformers 201, 202 is derived.

If the inductances Ls1 and Lh2 and the capacitances C1 and C2, for example, are dimensioned in such a way that the first and second transformer 201, 202 in each case have Butterworth behaviour, the ripple of the transmission frequency path of the transformer circuit arrangement 200 according to the invention will be minimised. A further minimisation or optimisation can be achieved in that the first upper limit frequency fo1 and the second lower limit frequency fu2 lie at an insertion loss in each case of 6 dB or a value of the individual transmission function of 6 dB.

FIG. 3 shows the individual curves of the insertion loss of the transformers 201, 202, 200, as well as the phase of the overall transformer 200 relating to them, for the circuit from FIG. 2, as a function of the signal frequency f in proportion to the transmission frequency fc, which in this case is equal to the first upper limit frequency fo1 and equal to the second lower limit frequency fu2, and at which the attenuation of the part transformers in each case amounts to about 6 dB. The component elements and the elements of the equivalent circuit diagrams of the two transformers of the circuit from FIG. 2 are in this situation dimensioned as follows:

$$Ls1 = \tilde{L}1 \cdot Z0 \cdot \frac{1}{2 \cdot \pi \cdot fc},$$

$$Lh2 = \tilde{L}2 \cdot Z0 \cdot \frac{1}{2 \cdot \pi \cdot fc},$$

$$C1 = \frac{\tilde{C}2}{Z0} \cdot \frac{1}{2 \cdot \pi \cdot fc},$$

$$C2 = \frac{\tilde{C}2}{Z0} \cdot \frac{1}{2 \cdot \pi \cdot fc}$$

with the normed values $\tilde{L}1=0,2755,$ $\tilde{L}2=\tilde{C}2=0,09195$ $\tilde{C}1=0,2755.$ The reference resistance (input and/or output resistance) Z0 is to be selected according to the application, and amounts for XDSL applications, for example, 100 Ω or 135 Ω.

In FIG. 3a, the curve 301 of the insertion loss S21 of the first transformer 201 and the curve 302 of the insertion loss S21 of the second transformer 202 are compared with one another. Both have a Butterworth characteristic of the second order. The point of intersection lies at the transmission frequency fc and an attenuation of approx. 6 dB.

The curve 303 of the insertion loss S21 of the connection of the first and second transformers 201, 202 to form the overall transformer 200 as a function of the signal frequency f is represented in FIG. 3b. The insertion loss S21 in this case amounts to 0 dB over the entire frequency range. The curve 304 of the phase response argS21 of the overall transformer is shown in FIG. 3c. At the signal frequency fc this has a phase jump of some −2n.

If one or both of the transformers used has a transformation ratio ü which differs from the value one, this is to be taken into account for the dimensioning of the component elements and the layout of the circuit. The equivalent circuit diagram corresponding to FIG. 3 is represented in FIG. 4, taking account of the transformation ratios of the first and second transformers 201, 202. In this situation, the equivalent circuit diagram explained previously of the first transformer 101 is extended by a first ideal transformer 401 with a transformation ratio ü or ü:1 respectively, and the equivalent circuit diagram of the second transformer 101 is extended by a second ideal transformer 402 with a transformation ratio ü or ü:1 respectively. The transformation ratios of the ideal transformer 401, 402 can also be different, so that for the first ideal transformer, for example, a first transformation ratio of ü1 or ü1:1 is derived, and a second transformation ratio of ü2 or ü2:1 respectively for the second ideal transformer. In order to achieve a power adjustment of the circuit, another output resistor 319 is selected, which in this example is derived from the multiplication of the input resistance Z0 with the factor $1/\ddot{u}^2$. Accordingly, for the dimensioning referred to above of the components, the normed first capacitance $\check{C}1$ is derived as a function of the transformation ratio ü from:

$$\check{C}1 = 0{,}2755 \cdot \ddot{u}^2$$

In FIG. 5, another equivalent circuit diagram is represented for the first and/or second transformer. The transformer 501, together with the ideal transformer 505, with the transformation ratios ü1,2 (ü1 for the first ideal transformer, ü2 for the second ideal transformer), has a loss resistance 502 or R1, 2 respectively (R1 for the first transformer, R2 for the second transformer), a parallel main inductance 504 or Lh1,2 respectively (Lh1 for the first transformer, Lh2 for the second transformer) and a serial scatter inductance Ls1,2 (Ls1 for the first transformer, Ls2 for the second transformer). The transformer 501 has the two inputs 506 and 507 as well as the two outputs 508 and 509.

If the first transformer 201 from FIG. 4 is replaced by the transformer from FIG. 5, and the second transformer 202 from FIG. 4 by the transformer from FIG. 5, and a dimensioning selected, for example, of $$R1 = R2 \frac{Z0}{10}$$

$$\frac{Lh1}{Ls1} = \frac{Lh2}{Ls2} = 100$$

then the curves are derived which are represented in FIG. 6. In FIG. 6a, the curve 601 of the insertion loss S21 of the first transformer 201, dimensioned in this way, and the curve 602 of the insertion loss S21 of the second transformer 202, dimensioned in this way, are compared with one another. The point of intersection is located at the transmission frequency fc and an attenuation of approx. 6 dB. From the rising part of the curve 601 of the first transformer and the falling part of the curve 602 of the second transformer it can be seen that in this case the first lower limit frequency fu1 lies on a signal frequency f which differs from zero, and the second upper limit frequency fo2 adopts an infinite value.

Figure 6C:
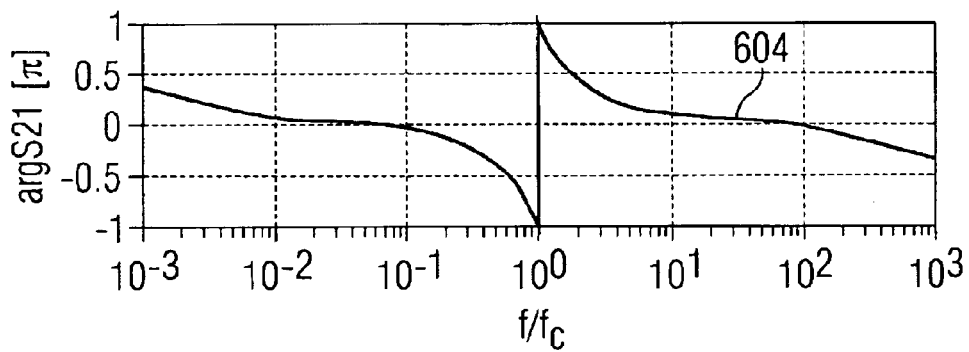

The corresponding curve 603 of the insertion loss S21 of the combined circuit of the first and second transformers 201, 202, as a function of the signal frequency f, is shown in FIG. 6b. In comparison with the curve 303 from FIG. 3b, the curve 603 has a lesser ripple as well as a rising and a falling flank. In addition to this, the value of the insertion loss S21 is not quite 0 dB. The curve 604 of the phase response argS21 is shown in FIG. 6c. At the signal frequency fc a phase jump of some −2Π, but in comparison with the curve 304 from FIG. 3c it has an initial and final value in each case which differ from zero.

Figure 6D:
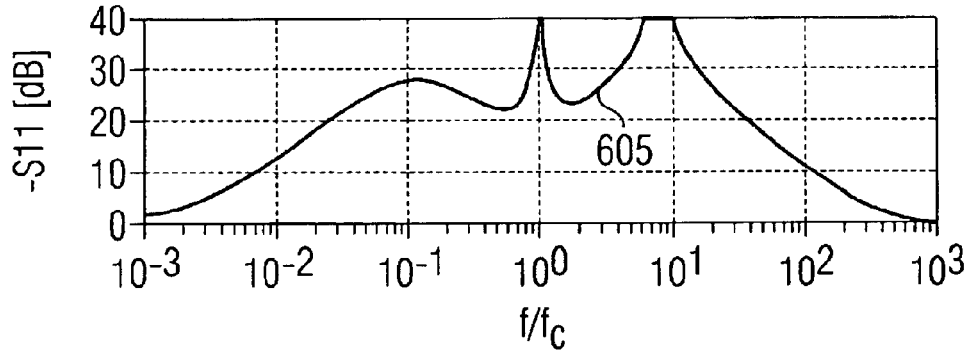

The curve 605 from FIG. 6d shows the corresponding active return loss 1/S11 of the combined connection of the first and second transformer as a function of the signal frequency f.

FIG. 7 shows a schematic circuit diagram of a further embodiment of the transformer circuit arrangement according to the invention. The transformers 101 and 102 can be laid out in accordance with the corresponding equivalent circuit diagrams from FIG. 1, FIG. 4, or FIG. 5, and in particular according to FIG. 5. In this case, the first transformer 701 has, in addition to the first transformer 101 and the capacitance 217, C1 connected downstream of this, also two supplementary inductances 707 and 708, connected in series upstream of the first transformer 101, these in each case corresponding to a part supplementary inductance of 0.5 Lz, so that in total a serial supplementary inductance of Lz is formed. Another distribution or allocation of the part inductance values is also possible. Thus, for example, only one of the two supplementary inductances 707, 708 need to be provided for, which then has a size of Lz. In another embodiment, the supplementary inductances 707, 708 can also be connected in series downstream of the first transformer 101.

The first transformer 701, extended by the supplementary inductances 707, 708, has the two inputs 703 and 704, as well as the two outputs 705 and 706. The transformer circuit arrangement according to the invention, formed by the interconnection of the first transformer 701 and the second transformer 202, has two inputs 711 and 712, as well as two outputs 713 and 714.

The interconnections shown in the Figures of the inputs of the first and second transformers, and the outputs of the first and second transformers, can also be effected, for example, in such a way that the inputs are connected in series and the outputs in parallel. The arrangement of the first capacitance C1, the second capacitance C2, and their part capacitances and/or the additional inductance(s) Lz can accordingly be arranged in a mirror image to the transformer to which they pertain, so that the component elements represented as connected upstream in the Figures are in fact connected downstream, and the downstream components are connected upstream.

If appropriate, an additional circuit connection according to the invention of one or more additional individual transformers is also conceivable, whereby in particular a recursive arrangement is possible of such a type, for example, that a further transformer is additionally connected to a transformer circuit arrangement of the type described heretofore, in order to obtain a new transformer circuit arrangement of the type described heretofore, whereby in this case the original transformer circuit arrangement serves as the first or second transformer, and the additional transformer connected serves as the second or first transformer respectively of the new transformer circuit arrangement.

What is claimed is:

1. Transformer Circuit Arrangement
with a first transformer with at least two inputs and at least two outputs and a first frequency response with a first lower limit frequency and a first upper limit frequency, and
with a second transformer with at least two inputs and at least two outputs and a second frequency response with a second lower limit frequency and a second upper limit frequency,
whereby the first lower limit frequency is smaller than the second lower limit frequency and the second upper limit frequency is greater than the first upper limit frequency,
whereby at least one input of the first transformer is electrically connected to an input of the second transformer and at least one output of the first transformer is connected to an output of the second transformer, and
whereby the frequency response of the transformer circuit arrangement has a bandpass behaviour with a lower overall limit frequency and an upper overall limit frequency, whereby the lower overall limit frequency is smaller than the first upper limit frequency and the second lower limit frequency, and the upper overall limit frequency is greater than the second lower limit frequency and the first upper limit frequency.

2. Transformer circuit arrangement according to claim 1, wherein the first transformer has a first transformation ratio, a first main inductance, and a first scatter inductance, and wherein the second transformer has a second transformation ratio, a second main inductance, and a second scatter inductance.

3. Transformer circuit arrangement according to claim 2, wherein the first transformation ratio is as great as the second transformation ratio.

4. Transformer circuit arrangement according to claim 1, wherein the inputs of the transformers are connected in parallel or in series.

5. Transformer circuit arrangement according to claim 1, wherein the outputs of the transformers are connected in series or in parallel.

6. Transformer circuit arrangement according to claim 1, wherein a first capacitance is connected in parallel with the first transformer, downstream or upstream.

7. Transformer circuit arrangement according to claim 1, wherein a second capacitance is connected in parallel with the second transformer, upstream or downstream.

8. Transformer circuit arrangement according to claim 1, wherein the first frequency response and/or the second frequency response has a Butterworth behaviour.

9. Transformer circuit arrangement according to claim 1, wherein the first frequency response and/or the second frequency response has a Butterworth behaviour of the second order.

10. Transformer circuit arrangement according to claim 1, wherein the first transformer and/or the second transformer has an insertion loss of some 6 dB at the individual lower and/or upper first or second limit frequencies respectively.

11. Transformer circuit arrangement according to claim 1, wherein the first upper limit frequency is approximately the same as the second lower limit frequency.

12. Transformer circuit arrangement according to claim 1, wherein the lower overall limit frequency is approximately equal to the first lower limit frequency and/or the upper overall limit frequency is approximately equal to the second upper limit frequency.

13. Transformer circuit arrangement according to claim 1, wherein an additional inductance is connected in series with the first transformer, upstream or downstream.

14. Transformer circuit arrangement according to claim 1, wherein the transformer circuit arrangement is designed for the transfer of signals in message transmission systems.

15. Transformer circuit arrangement according to claim 1, wherein the second lower limit frequency is not greater or smaller by a factor of 10 than the first upper limit frequency.

16. Transformer circuit arrangement according to claim 1, wherein the first transformer and/or the second transformer is formed by a transformer circuit arrangement according to claim 1.

* * * * *